United States Patent

[11] 3,633,868

[72] Inventor Carmen Catania
Erie, Pa.
[21] Appl. No. 60,727
[22] Filed Aug. 3, 1970
[45] Patented Jan. 11, 1972
[73] Assignee Hays Manufacturing Company
Erie, Pa.
Continuation-in-part of application Ser. No.
753,636, Aug. 19, 1968, now abandoned.
This application Aug. 3, 1970, Ser. No.
60,727

[54] SOLENOID-CONTROLLED PILOT VALVE
4 Claims, 4 Drawing Figs.
[52] U.S. Cl. ..................................... 251/30,
251/38, 251/44
[51] Int. Cl. ..................................... F16k 31/143,
F16j 9/00
[50] Field of Search ........................... 251/30, 38,
44; 277/216

[56] References Cited
UNITED STATES PATENTS
1,528,771 3/1925 Jackson ..................... 277/216

| | | | |
|---|---|---|---|
| 2,812,196 | 11/1957 | Atkinson ..................... | 277/216 X |
| 2,877,071 | 3/1959 | Arnot ........................... | 277/216 X |
| 3,307,823 | 3/1967 | Greer ........................... | 251/30 |
| 3,424,427 | 1/1969 | Ruchser ...................... | 251/44 X |

Primary Examiner—Arnold Rosenthal
Attorney—Charles L. Lovercheck

ABSTRACT: The invention herein involves a pilot-controlled piston-operated valve, where the piston is reciprocably received in a cylindrical chamber. The inlet to the valve is separated from the outlet by a partition having an opening, and the piston has an extension extending into the opening. The piston has a piston ring, which is split at an angle of approximately 15° which acts as a bypass opening from inlet to the space above the piston whereby fluid can flow from the inlet through the split in the piston ring by capillary action to the space above the piston, and when the pilot closes the pilot orifice in the piston, the pressure of this fluid will force the pilot piston to closed position. When the piston is in open position, the liquid will flow directly from the inlet through the opening in the partition.

PATENTED JAN 11 1972

3,633,868

INVENTOR.
CARMEN CATANIA
BY

SOLENOID-CONTROLLED PILOT VALVE

REFERENCE TO PRIOR APPLICATION

This application is a continuation-in-part of Pat. application Ser. No. 753,636 filed Aug. 19, 1968, and now abandoned.

It is, accordingly, an object of the invention to provide an improved valve.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
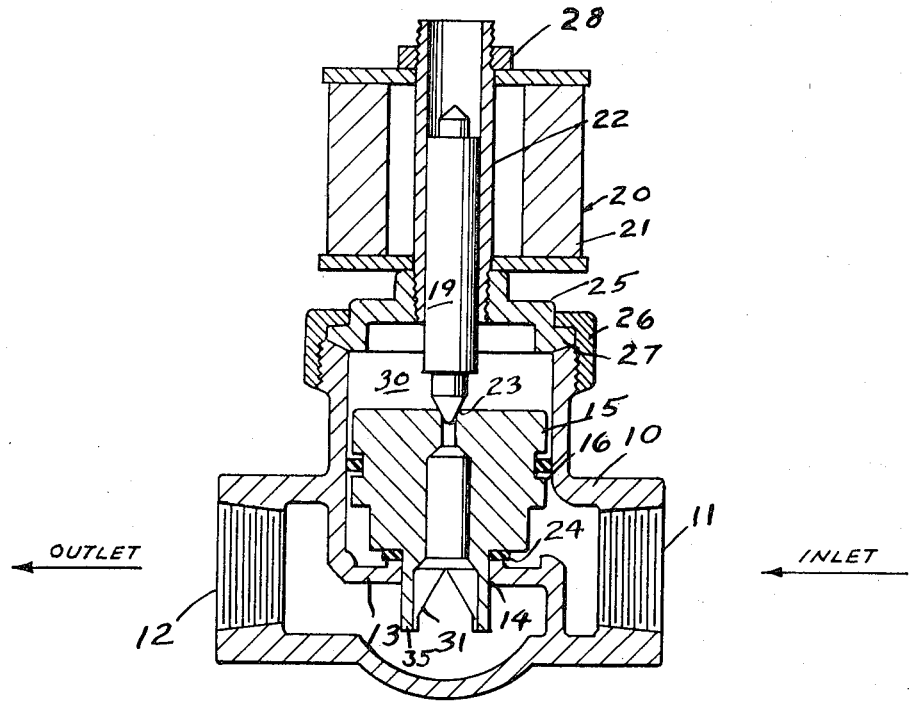
FIG. 1 is a longitudinal cross-sectional view of the valve according to the invention.
Figure 4:
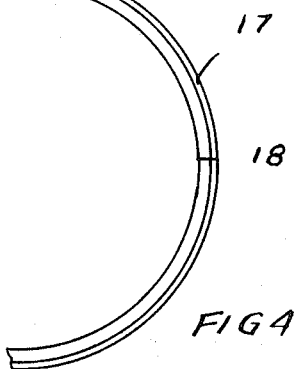
FIG. 4 is a partial top view of the piston ring.
Figures 2, 3:
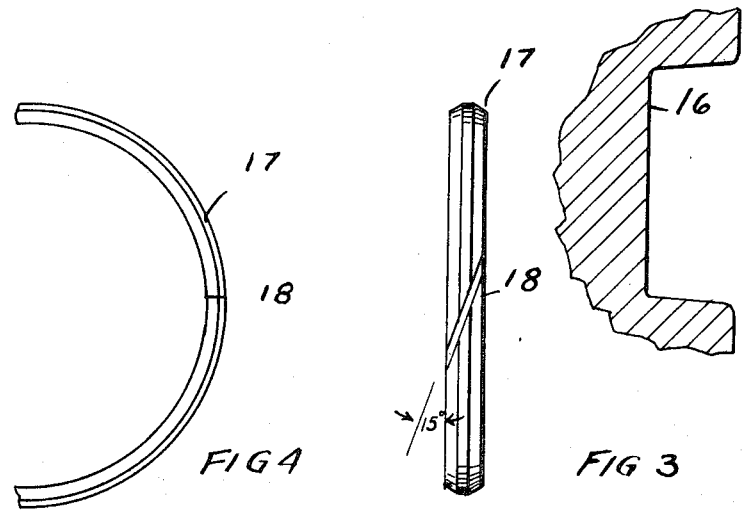
FIG. 2 is an enlarged view of the piston ring groove.
FIG. 3 is a side view of the piston ring as it might appear if the ring were out of the valve with the ends extended.

Now with more particular reference to the drawings, the valve has a body 10 with an inlet 11 and an outlet 12 separated by partition 13. The partition has an opening 14 and the piston 15 is slidably received in a cylindrical surface inside the valve body. The piston has a ring 17 supported in its peripheral groove 16. The piston ring is split with ends approximately 75° to the axis of the piston. FIG. 3 shows the ring out of the valve with its ends forced apart. In the valve the gap is closed and the ends of the ring defining the split come together in engagement with each other. There remains a capillary path which is sufficient to pass the required amount of water from below the valve and also to allow the water to flow in the reversed direction as needed. At the temperature for which the ring is designed, the ring is in a plane. At a higher temperature the ring expands, the two ends slide on each other, and the ring is no longer in a plane. The top and bottom (as installed in the valve) form a slight helix. The capillary opening is still maintained because of the water pressure on the inside diameter of the ring. They are of a relatively smooth finish so that the space between them allows fluid to flow. As the piston moves up and down, there is a slight sliding action between the ends of the piston ring which maintains them in contact and also maintains the space. The piston ring also elongates and decreases in length due to temperature changes which also results in a sliding action. The 15° angle disclosed facilitates the sliding movement of the ends and the change in length of the ring due to the movement described above has no practical significance so far as the flow rate through the split is concerned. This leakage provides a sufficient amount of water to give the necessary amount of water into chamber 30. The pilot plunger 19 is reciprocably received in the tube 22, and tube 22 is threadably received in and thereby fixed to the bonnet 25. Bonnet 25 extends up through the solenoid. The nut 28 clamps the solenoid 20 between it and the upper flange on the bonnet 25. The bonnet is held in place by the bonnet nut 26 that rests on the shoulder 27 of the bonnet nut.

The extension 35 on the piston extends through opening 14 and lateral groove 31 is formed in it. In operation, when the solenoid is unactuated, and the pilot plunger 19 is in the position shown, water from inlet 11 will pass through the split in the piston ring 17 defined by its two ends and fill the chamber 30. This pressure will build up to line pressure and since the area above the piston is greater than the area below the piston, the total pressure above the piston will overcome the pressure below and will force the piston to closed position.

When the solenoid is actuated, the pilot plunger 19 will be lifted by electromagnetic force away from the seat 23. This will allow the pressure in the chamber 30 to drop, and since the pressure below the piston will then be greater than the pressure in chamber 30, the piston will rise and fluid from the inlet 11 can flow through the groove 31 in the lower end of the piston extension to the outlet 12.

The split ends of the piston ring can be controlled by adjusting the length of the piston ring to suitable limits, so that the operation of the valve will be smooth and proper.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A valve comprising a body having an inlet port and an outlet port,
   a partition in said body separating said ports,
   an opening through said partition,
   a cylindrical space defined by a cylindrical surface,
   a piston reciprocably received in said space,
   said piston being adapted to move to a closed position closing said opening and to an open position away from said opening,
   a pilot passage through said piston,
   support means on said valve for a solenoid,
   said support means, said cylinder space, and said piston defining a pilot space,
   a pilot member extending into said pilot space and adapted to close said pilot passage,
   a piston ring on said piston,
   said piston ring being split at one side thereof, at an angle of approximately 15°, with the ends of said ring defining said split being in engagement with each other and defining a capillary passage of uniform size regardless of expansion of the ring from said inlet to said space whereby liquid flowing through said split builds up pressure above said piston and when said pilot closes said pilot passage, said piston is forced to closed position.
2. The valve recited in claim 1 wherein said piston has an extension extending through said opening in said partition.
3. The valve recited in claim 2 wherein said valve has a solenoid thereon,
   said solenoid has means receiving said pilot,
   said solenoid being adapted when energized by an electric current to lift said pilot from said partition.
4. The valve recited in claim 3 wherein said solenoid means receiving said pilot comprises a bonnet on said valve,
   a tube threadably received in said bonnet and extending into said solenoid,
   said pilot being slidably received in said tube.

* * * * *